US007681182B1

(12) United States Patent
Mistry et al.

(10) Patent No.: US 7,681,182 B1
(45) Date of Patent: Mar. 16, 2010

(54) INCLUDING FUNCTION CALL GRAPHS (FCG) GENERATED FROM TRACE ANALYSIS DATA WITHIN A SEARCHABLE PROBLEM DETERMINATION KNOWLEDGE BASE

(75) Inventors: Harjindersingh G. Mistry, Gujarat (IN); Mithun B. Virajpet, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/266,207

(22) Filed: Nov. 6, 2008

(51) Int. Cl.
G06F 9/44 (2006.01)
G06F 11/00 (2006.01)

(52) U.S. Cl. .................. 717/132; 714/48; 714/25

(58) Field of Classification Search ............... None
See application file for complete search history.

(56) References Cited

U.S. PATENT DOCUMENTS

| 6,588,009 | B1* | 7/2003 | Guffens et al. ........... 717/161 |
| 6,728,955 | B1* | 4/2004 | Berry et al. ............ 717/158 |
| 6,996,806 | B2* | 2/2006 | Bates et al. ............ 717/125 |
| 7,171,585 | B2 | 1/2007 | Gail et al. |
| 7,191,364 | B2 | 3/2007 | Hudson et al. |
| 7,320,125 | B2 | 1/2008 | Elliott et al. |
| 2007/0038896 | A1 | 2/2007 | Champlin et al. |
| 2007/0050679 | A1 | 3/2007 | Reddy |
| 2007/0283337 | A1 | 12/2007 | Gupta et al. |
| 2008/0178161 | A1 | 7/2008 | Cates |
| 2008/0244531 | A1 | 10/2008 | Schmelter et al. |
| 2009/0089805 | A1* | 4/2009 | Srinivasan ............. 719/318 |

OTHER PUBLICATIONS

David Grove, Craig Chambers, "A framework for call graph construction algorithms", Nov. 2001, Transactions on Programming Languages and Systems (TOPLAS), vol. 23 Issue 6, pp. 685-746.*
Damien Sereni, "Termination analysis and call graph construction for higher-order functional programs", Oct. 2007, ICFP '07: Proceedings of the 12th ACM SIGPLAN international conference on Functional programming, pp. 71-83.*
Atanas Rountev, Scott Kagan, Michael Gibas, "Static and dynamic analysis of call chains in java", Jul. 2004, ISSTA '04: Proceedings of the 2004 ACM SIGSOFT international symposium on Software testing and analysis, pp. 1-11.*
Maruyama, N., et al., "Model-Based Fault Localization in Large-Scale Computing Systems," IEEE International Symposium on Parallel and Distributed Processing, pp. 1-12, Apr. 14-18, 2008.

(Continued)

*Primary Examiner*—Philip R. Wang
(74) *Attorney, Agent, or Firm*—Patents on Demand, P.A.; Brian K. Buchheit

(57) ABSTRACT

A trace file providing details of an execution of a software application experiencing unexpected behavior can be identified. The trace file can be converted into a graph structure (e.g., Function Call Graph), which details functions called during the execution, a calling relationship, and errors encountered during the execution. The converted graph structure can be programmatically matched against a set of stored graph structures to determine matched results. Each stored graph structure can correspond to unique record of a symptom database. Each unique record can be associated with a determined problem. The matched results can be provided as possible problems causing the unexpected behavior of the software application.

6 Claims, 3 Drawing Sheets

OTHER PUBLICATIONS

Kranzmueller, D., "Event Graph Analysis For Debugging Massively Parallel Programs," Dissertation, Linz, Sep. 2000.

Zaidman, A., et al., "Program Comprehension through Dynamic Analysis," Software Engineering Research Group, Delft University of Technology, The Netherlands, 2007.

Mirgorodskiy, A.V., et al., "Problem Diagnosis in Large-Scale Computing Environments." Conf. on High Performance Networking and Computing, Art. 88, 2006 ACM/IEEE Conf. on Supercomputing, Nov. 2006.

Queen, M., "Interaction Modeling, User State-Trace Analysis," Boxes and Arrows, Feb. 12, 2006.

Borgeest, R., et al., "Trace Analysis with a Relational Database System," Proceedings of the 4th Euromicro Workshop on Parallel and Distributed Processing, p. 243, 1996.

Brodie, M., et al., "Quickly Finding Known Software Problems via Automated Symptom Matching", IEEE International Conference on Autonomic Computing (ICAC), Jun. 13-16, 2005, pp. 101-110.

\* cited by examiner

Routine (Pseudo Code) 250: Extract FCG from trace file
Input:
 1. A Trace file, which follows the above format.
Output:
 Function call graph for the input trace
Steps:
Initialization of variables
nodeStack = NULL
parentNode = NULL
curNode = NULL For each line in the input trace file, do
{
  if ( record is of type "Entry" ) then
  {
       Create a new node with label = funcName and call it curNode
       Push( nodeStack, curNode )
       if ( parentNode != NULL )
       {
            Insert an edge from parentNode to curNode
       }
       parentNode = curNode
  }
  else if (record is of type "Exit" ) then
  {
       Pop( nodeStack )
       parentNode = Top( nodeStack )
  } else if (record is of type "Error" ) then
  {
       Create a new node with label = "Error" and call it errNode
       insert an edge from parentNode to errNode
  }
}

---

Routine (Pseudo Code) 252: Insert Symptoms

Input:
1. Symptom Database: Collection of known patterns ( FCGs ) and causes of known problems
2. User's trace file
Steps:
1. Using routine 250, extract FCG ( UserFCG ) from the user's trace file
2. Insert the UserFCG graph and cause into the symptom database.

---

Routine (Pseudo Code) 254: Search Symptoms

Input:
   1. Symptom Database: Collection of known patterns ( FCGs ) and causes of known problems
   2. User's trace file
Output:
   Known symptoms that occurred in the input trace files
Steps:
1. Using routine 250, extract FCG ( UserFCG ) from the user's trace file
2. From the symptom database, find all the patterns that are contained within the UserFCG i.e. find all the symptom patterns ( graphs ), which are subgraphs of the input UserFCG*.
3. The resultant patterns have causes for the known problems. They can be considered as possible causes in the current analysis

*Note: The system can even support finding all patterns where UserFCG is a subgraph of the stored FCG in the symptom database.

FIG. 2B

INCLUDING FUNCTION CALL GRAPHS (FCG) GENERATED FROM TRACE ANALYSIS DATA WITHIN A SEARCHABLE PROBLEM DETERMINATION KNOWLEDGE BASE

BACKGROUND

The present invention relates to the field of knowledge repositories and, more particularly, to using function call graphs (FCG) generated from trace data within a searchable problem determination knowledge base.

Computer programs exist that trace execution behavior of a software executable for purposes of detecting and curing error conditions. These trace programs provide a repository of information that can be analyzed when a software program exhibits unexpected behavior. Human analysts can use the stored repository information to determine what was internally occurring during program execution and to ascertain an exact sequence of events, which lead to the unexpected behavior. Once a source of a problem is known, a solution to this problem (or work-around) can be developed. Currently, the troubleshooting and problem determination process is a highly manual one that consumes substantial time. Further, an ability to identify symptoms, to trace system activities to determine a problem locus is dependent upon an analysis skill level of a human agent.

Many attempts have been made to establish a knowledge base, which is useful to analysts performing problem determination tasks. With current knowledge bases, an analyst assigned to the problem is encouraged to record details related to the problem, a root cause determined for the problem, along with a problem resolution. All of this information is placed in the knowledge base. The information is typically stored in searchable database records. It is presumed that when future problems arise, the knowledge base will be searched by analysts who can benefit from past analysis efforts.

The recordation and searching of problem determination knowledge into/from the knowledge base is a manual process, as is the problem determination process itself. A quality and usefulness of a conventional knowledge base is dependent upon a quality and nature of data manually input into the system. A quality of this input is often suspect for many reasons. For example, skilled analysts are typically incentivized to properly perform troubleshooting tasks through promotion, raises, continued employment, and the like. In contrast, entry of high-quality problem determination data into a knowledge base, even if required by a company, is not a process for which a skilled analyst is rewarded. It is nevertheless a time consuming and thought laden endeavor. Analysts forced to input data into a knowledge base often do so in a haphazard manner, providing data of dubious quality. Thus, no guarantees or safeguards exist regarding an output-quality of data stored within a conventional knowledge base.

Further, there is no assurance in conventional knowledge base systems that a search of the knowledge base will return optimal results. That is, existing systems provide a keyword-based search. When a user query is based upon key words that are not consistent with words input by a previous analysts, stored and relevant problem resolution data will not be returned. Consequently, for conventional knowledge bases, a relevancy of output depends upon a manner in which an input-query is framed.

BRIEF DESCRIPTION OF THE SEVERAL VIEWS OF THE DRAWINGS

FIG. 2B illustrates pseudo code for a set of software routines for implementing functions related to creating a FCG from a user's trace information, inserting FCG included records in a knowledge base, and searching a knowledge base using a FCG.

DETAILED DESCRIPTION

Figure 1:
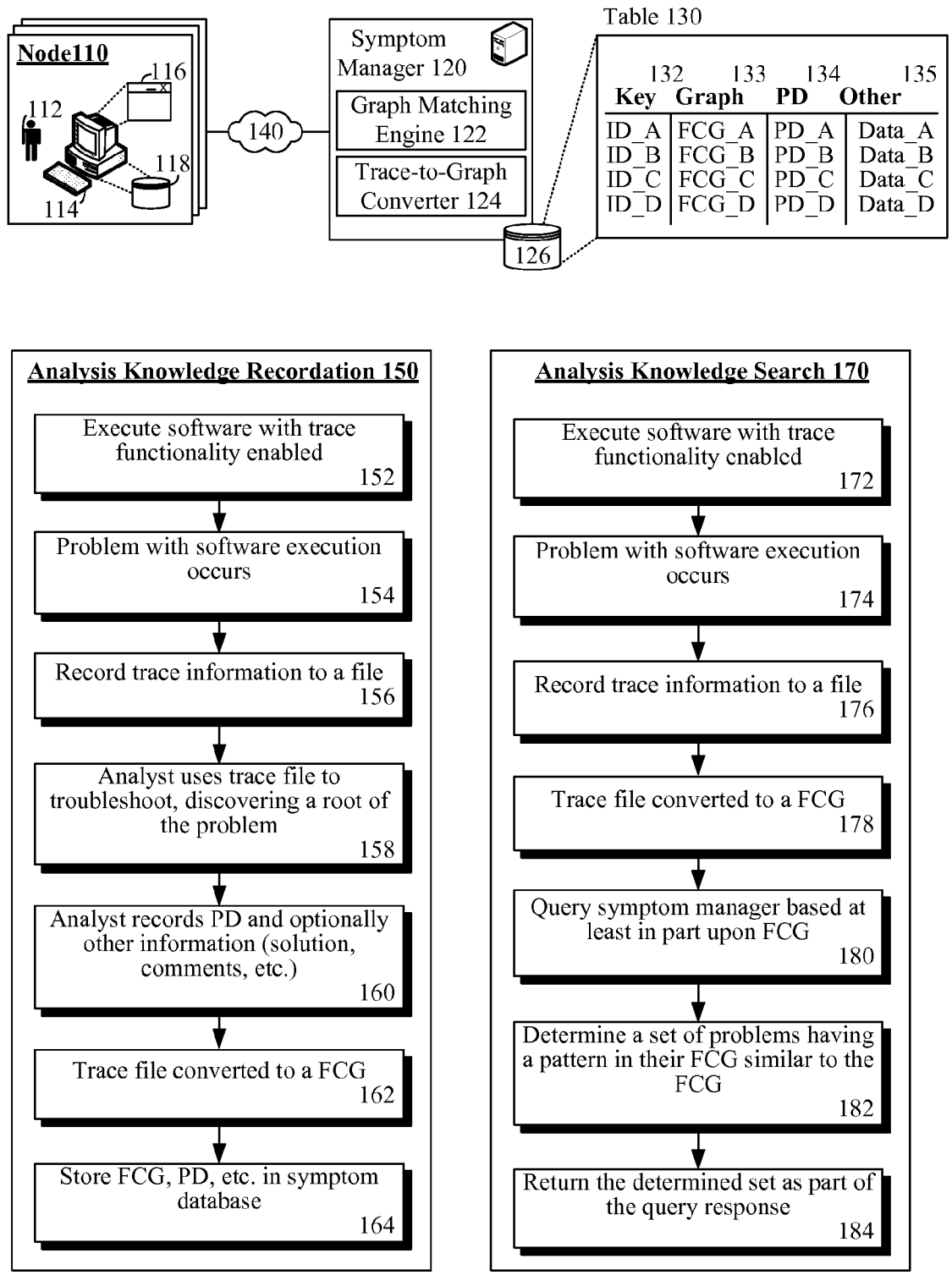
FIG. 1 shows a schematic diagram of a symptom manager configured to store problem descriptions that include function call graphs (FCG), which can be searched for matching patterns in accordance with an embodiment of the inventive arrangements disclosed herein.

The present invention automates aspects of knowledge base recordation and searching in a context of software application troubleshooting or any other context where a "trace program" is used. An embodiment of the invention converts output of a trace program into a function call graph (FCG). The FCG can be a structure that includes a set of nodes, which are connected through directional edges. Each node can present a function and each directional edge can indicate that one function called another. Unexpected behavior of a software application including error conditions can be recorded in a FCG. Each error in a FCG can be traced backwards to determine a time ordered sequence of actions leading to the error. Each time unexpected behavior is experienced, a FCG for that behavior can be stored in a knowledge base along with an optional set of analysts input data elements.

When future problems occur for which troubleshooting tasks are needed, a FCG can be generated. A FCG related to a problem to be resolved can be an input parameter for a knowledge query. Current FCG can be compared against patterns in stored FCGs. A query result can be based on all the patterns which contain the given FCG and/or all the patterns which are contained in the given FCG. Either way, inclusion of FCGs can significantly improve a quality of a problem determination knowledge base, can improve relevancy and consistency of search results, and can even decrease manual efforts needed to record and maintain the knowledge base.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer usable storage medium having computer usable program code embodied in the medium. In a preferred embodiment, the invention is implemented in software, which includes but is not limited to firmware, resident software, microcode, etc.

Furthermore, embodiments of the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. Examples of a computer readable medium include a semiconductor or solid state memory, magnetic tape, a removable computer diskette, a random access memory (RAM), a read-only memory (ROM), an erasable programmable read-only memory (EPROM) or Flash memory, a rigid magnetic disk and an optical disk. Current examples of optical disks include compact disk-read only memory (CD-ROM), compact disk-read/write (CD-R/W) and DVD. Other computer readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer usable or computer readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows a schematic diagram of a symptom manager 120 configured to store problem descriptions that include function call graphs (FCG), which can be searched for matching patterns in accordance with an embodiment of the inventive arrangements disclosed herein. The symptom manager 120 can be connected to a node 110 via a network 140. The node 110 can include a user 112 which interacts with manager 120 through a computing device 114. The computing device 114 can include an application 116 able to be traced and a data store 118 in which local trace data can be stored. The symptom manager 120 can include a graph matching engine 122 and a trace-to-graph converter 124.

A data store 126 containing a set of related tables that can be accessible by the symptom manager 120. One of the tables (table 130) can include a set of unique records. Related ones of these records can include a unique key 132, a graph structure 133, a problem description 134, and other data 135. In one embodiment, the table 130 can be part of an RDBMS, where the table 130 can be in third normal form and can relate to records contained in other database tables via primary key 132 and through optional foreign keys (not shown).

The component arrangements of FIG. 1 are not limited to any particular component arrangement, so long as a net effect of cooperating components achieves a net effect as described. For example (and as shown in FIG. 1), a software application 116 being traced can execute within a client device 114 connected to a server 120, which hosts the symptom manager 120. In another contemplated embodiment, however, the traced software application 116 can execute within a server, which also includes engine 122 and converter 124. In still another embodiment, engine 122, converter 124, and application 116 can all reside on a client computer 114. In yet another application, the graph matching engine 112 and the trace to graph converter 124 can be implemented in functionally or geographically distinct computing devices connected via network 140.

A series of programmatic actions can be specified by one or more software programs executing in the symptom manager 120, the node 110, and/or network 140 elements that perform programmatic actions of process 150 and process 170. Process 150 can be an analysis knowledge recordation process, which can begin in step 152, where software (e.g., application 116) can execute with a trace functionality enabled. In step 154, a problem can occur during the application 116 execution. In step 156, trace information can be recorded to a file, which can be placed in a storage medium (e.g., data store 118). In step 158, an analyst (e.g., user 112) can use the trace file to troubleshoot a source of the problem. In step 160, the analyst 112 can record problem determination (PD) data (e.g., data 134) and can optionally record additional related information (e.g., other 135), such as a solution to the determined problem, salient characteristics or symptoms of the problem, comments, etc. This information can be stored in a knowledge base (e.g., data store 126), which may be remotely located from the device 114, upon which the application 116 executed. In step 162, the trace file can be converted into a FCG (i.e., by trace-to-graph converter 124). In one embodiment, the trace file may optionally be preliminarily converted into a form for ease of transport over network 140. For example, the trace file can be placed in an extensible markup language (XML) or other markup format, such as shown by sample trace file 240. In step 164, the FCG 133, PD 134, and other data 135 can be related (e.g., key 132) to each other and stored in a symptom database (e.g., data store 126). In one embodiment, a reference or pointer to the FCG 133 can be stored in the symptom database and the actual FCG can be stored in a different data store.

Process 170 can be an analysis knowledge search process. Steps 172-176 can be equivalent to step 152-156. That is, traced software can execute (172), experience a problem (174), and trace information can be recorded to a file (176). This trace information can be converted into a FCG using converter 124, as shown by step 178. In step 180, a query can be submitted to the symptom manager 120, where one input parameter is the FCG. In step 182, a set of problems stored in data store 126 having a pattern in their FCG 134 similar to FCG of the problem execution can be determined. This determination can be performed by graph matching engine 122. In step 184, the determined set of problems can be returned as part of the query response.

In one embodiment, these interactions can occur responsive to a user 112 search using a user interface of a device 114 remotely located from the data store 126 and/or the symptom manager 120. For example, this search of a problem determination knowledge base can be performed through a Web browser interface. In another embodiment, the search can be initiated through an automated query, which automatically submits the FCG of a problematic execution to symptom manager 120 so that graph matching engine 122 is able to determine a set of similar problems (having matching patterns) experienced in the past. This information can be automatically submitted to one or more troubleshooters (human agent), who may or may not be local to the device 114, which experienced the problem. Further, the troubleshooter and/or a set of programmatic actions taken responsive to the problem can be driven by data contained within the set of matching records from the knowledge base (126). Additionally, even if remote from device 114, a troubleshooter receiving the problem description and related problems may be able to utilize remote software agents to manipulate device 114 from a remotely located terminal. The remote troubleshooting embodiment is not to be interpreted as a limitation of the present invention, but is instead included to demonstrate a degree of implementation flexibility inherent in the disclosed solution, which is a level of flexibility and automation generally lacking in conventional problem management systems.

As used herein, trace file can be any file generated by monitoring an execution of an application 116. Trace files are often generated by debugging and other software monitoring agents. For example, trace files can include a set of discrete programmatic functions called during execution of the software application, a calling relationship among the set of programmatic functions, an end condition for each of the functions called, and any error conditions encountered during function execution. Any type or format of trace file can be used herein, so long as the trace file is able to indicate a sequence of actions and function calls performed by an executing application 116 and to indicate an occurrence of an error. That is, any variant of a trace file able to be placed in a format such as shown in sample file 240 is to be considered within scope of system 100. For example, in one embodiment, the trace file can be generated by the DB2TRACE executable of the DB2 software package.

A FCG is a graph representation showing a sequence of functions performed when executing application 116. For example, discrete nodes of a graph can represent software functions and a relationship among these nodes can show which functions call which other functions. The disclosure is not to be limited to any particular structure. That is, many different graph-based structures can be created to represent a series of functional calls and their outcomes. In one embodiment, a FCG can be a graph structure including a set of nodes, one for each discrete programmatic function of the trace file and one for each error condition of the trace file. The graph structure can also include a set of directional edges connecting the nodes. One connecting edge can exist for each calling relationship. One connecting edge can exist for connecting an error condition node and a function node for the discrete programmatic function associated with an error condition. One such graph is presented as sample FCG 242.

Graph matching engine 122 can be a computer program product (e.g., software/firmware) configured to match patterns present in one FCG (called an input FCG) with patterns present in a set of one or more other FCGs (called stored FCGs). These patterns can include a complete match of the FCGs, a match where an input FCG is a sub-graph of a stored FCG, a match where a stored FCG is a sub-graph of the input FCG, and other discernable patterns. For example, graph matching engine 122 can include, but is not limited to, GRACE, GRAPHGREP, GRAPHFIND, GINDEX, and the like.

Trace-to-graph converter 124 can be a computer program product (e.g., software/firmware) configured to convert a trace file into a FCG. In one embodiment, a set of conversion routines specific to different trace formats can execute to initially change a core dump (or other trace file) into a standardized trace file format (such as detailed in conventions 215 and shown in sample trace file 240.

Computing device 114 can be any device able to host a traceable application 116, which generates a trace file. The computing device 114 can include a personal computer, a virtual computing device, a server, a mobile phone, a kiosk, and the like.

Server 120 can include any set of hardware/software that is able to manage the information contained in data store 126. In one embodiment, the server 120 can host a database engine, such as an RDBMS engine. Server 120 can be implemented as a stand-alone machine, as a distributed set of machines, as a cluster of machines, as a virtual machine, and the like.

Network 140 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 140 can include local components and data pathways necessary for communications to be exchanged among computing device components and between integrated device components and peripheral devices. The network 140 can also include network equipment, such as routers, data lines, hubs, and intermediary servers which together form a packet-based network, such as the Internet or an intranet. The network 140 can further include circuit-based communication components and mobile communication components, such as telephony switches, modems, cellular communication towers, and the like. The network 140 can include line based and/or wireless communication pathways.

Data stores 118, 126 can be physically implemented within any type of hardware including, but not limited to, a magnetic disk, an optical disk, a semiconductor memory, a digitally encoded plastic memory, a holographic memory, or any other recording medium. The data stores 118, 126 can be a stand-alone storage unit as well as a storage unit formed from a set of physical devices, which may be remotely located from one another.

Figure 2A:
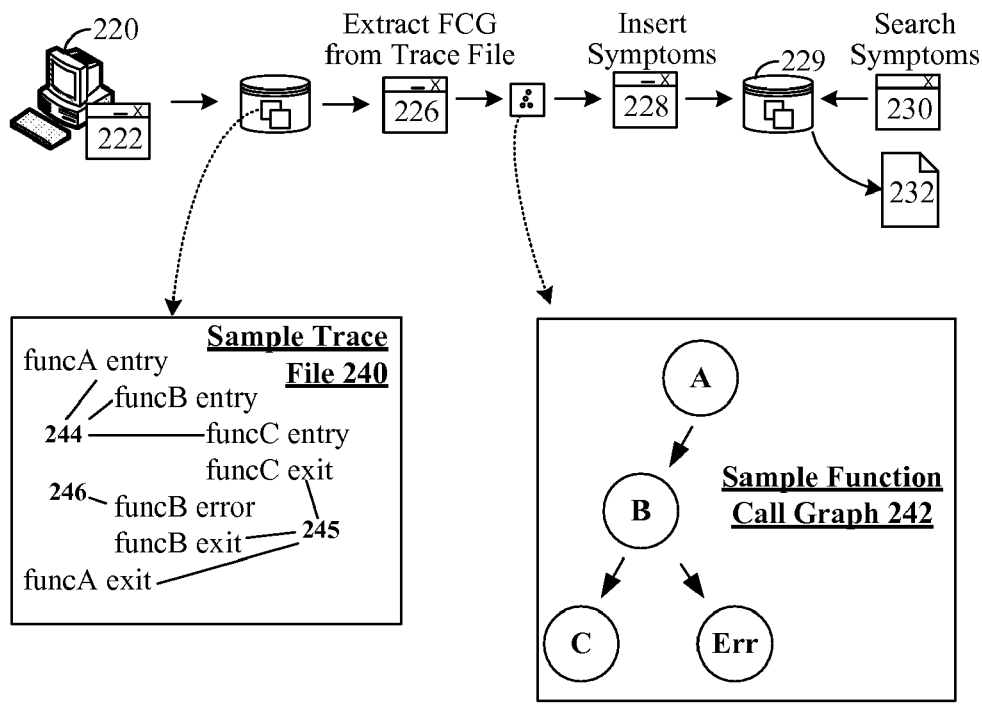
FIG. 2A illustrates format conventions that can be used when creating a trace file, a sample trace file, and a FCG.

FIG. 2 (includes FIGS. 2A and 2B) shows an example scenario where a function call graph (FCG) is managed as an object of a problem description knowledge base. More specifically, FIG. 2A illustrates format conventions 215 that can be used when creating a trace file 210, a sample trace file 240, and a sample FCG 242. FIG. 2B illustrates pseudo code for a set of routines 250, 252, 254 for implementing functions 226, 228, 230 related to creating a FCG, inserting FCG included records in a knowledge base, and searching a knowledge base using a FCG. In one embodiment, actual records in the knowledge base can store indexes or pointers to FCG structures as opposed to storing the FCG structures within the knowledge base itself.

As shown, a computing device 220 can execute a traced program 222, which produces sample trace file 240. Function 226 can extract a FCG from this trace file 240 resulting in sample FCG 242. Function 228 can insert this FCG 242 into a symptom data base 229. After which function 230 can query database 229 for matching patterns, thereby producing search result 232. Input for function 230 can include a FCG generated by function 226 from a trace file.

Specifics for creating sample trace file 240 are presented in 210, which are consistent with pseudo code 250, 252, 254. These specifics are not to be construed as an invention limitation, as these specifics include implementation choices and conventions that are expected to vary from implementation-to-implementation. As presented, assumptions when creating a trace file 210 include that whenever a function is called (during program execution 222), an "entry" record for the function is created in the trace file 240 (as shown by items 244 of file 240). When a function returns, an exit record is created (as shown by items 245 of file 240). When an error is encountered during function execution, an error record is created corresponding to this error (as shown by item 246 of file 240).

Standards detailing additional format conventions 215 related to creation of a trace file 240 can exist. In one implementation, for example, all records that appear in the trace file 240 can be recorded in chronological order. Records for the same function invocation can be indented on a same character-column in the file 240. Every record of the file 240 can be accommodated in a single line specific to that record. Every record can begin with a name of the function of the program 222 being executed and traced.

Assuming these standards 210 and conventions 215, an extract FCG from trace file procedure 226 can be implemented using routine 250. Routine 250 accepts a trace file as input and produces a FCG as output. Each line of the trace file is processed one at a time. When a processed line is an "ENTRY" then a new node labeled as the function name can be created. This node can be pushed onto a nodestack. If a parent node exists, than an edge from the parent node to the new node can be inserted into the FCG. When a processed line is an "EXIT" then a node can be removed from the node stack. If a processed line is an "ERROR" then a new node labeled as error can be created. An edge can be inserted from the parent node to the new node.

Additionally, an insert symptoms procedure 228 can be implemented using routine 252. Routine 252 can accept a user trace file as input. The symptom database itself can be considered another "input." When the routine 252 is executed by a database manager, the symptom database input can be a pointer/identifier of a database instance. A FCG can be extracted from the trace file using routine 250. Then, created FCG graph can be inserted into the symptom database along with any related data, such as a cause of the associated problem, analysts comments related to the problem, and the like.

The search symptoms procedure 230 can be implemented using routine 254. Routine 254 can accept a user trace file and a symptom database as input and can output a set of known symptoms. In routine 254, a FCG can be extracted from the input trace file. The newly created FCG can be searched for patterns of stored FCG. When patterns match, a problem related to the stored record can be considered relevant to the problem indicated in the user trace file. Matching patterns can include when the both FCGs match in their entirety, when the new FCG is a sub-graph of a stored graph, when a stored graph is a sub-graph of the new FCG, and/or the like. Matching records can indicate known problems and solutions, which can be considered possible problems/solutions for a currently experienced problem.

The diagrams in FIGS. 1, 2A, 2B illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of the disclosure. The embodiment was chosen and described in order to best explain the principles of the invention and the practical application, and to enable others of ordinary skill in the art to understand the disclosure for various embodiments with various modifications as are suited to the particular use contemplated.

What is claimed is:

1. A method for providing problem determination information comprising:
    converting, via a processor executing a computer program product stored in a storage medium, a trace file into a graph structure, the trace file comprising execution details of a software application experiencing unexpected behavior, the trace file comprising data for a set of discrete programmatic functions called during execution of the software application, a calling relationship among the set of programmatic functions, an end condition for each of the functions called, and any error conditions encountered during function execution, the error conditions comprising the unexpected behavior, the graph structure comprising a set of nodes, one for each discrete programmatic function of the trace file and one for each error condition of the trace file, and a set of directional edges connecting the nodes, one connecting edge for each calling relationship and one connecting edge connecting an error condition node and a function node for the discrete programmatic function associated with the error condition; and
    providing, via a processor executing a computer program product stored in a storage medium, results from matching the converted graph structure against a plurality of stored graph structures, wherein each stored graph structure corresponding to unique record of a symptom database, each the unique record also being associated with a determined cause of the unexpected behavior, wherein the matched results comprise identifiers for the determined causes associated with the unique records for which stored graph structures match the converted graph structure.

2. The method of claim 1, further comprising:
    adding, via a processor executing a computer program product stored in a storage medium, a record to the symptom database that includes a determined cause of the unexpected behavior and the converted graph structure, whereby the added record is able to be queried and returned as a possible cause of unexpected behavior during future queries of the symptom database.

3. The method of claim 1, wherein the records of the symptom database further: comprise analysts input details related to the determined cause of the unexpected behavior, wherein the provided results comprise the analysts input details.

4. A computer program product for providing problem determination information comprising:
    a computer readable physical storage medium having computer usable program code embodied therewith, wherein said computer usable program code is executable by a computer comprising at least a processor and a memory, the computer usable program code comprising:
    computer usable program code configured to convert a trace file into a graph structure, the trace file comprising execution details of a software application experiencing unexpected behavior, the trace file comprising data for a set of discrete programmatic functions called during execution of the software application, a calling relationship among the set of programmatic functions, an end condition for each of the functions called, and any error conditions encountered during function execution, the error conditions comprising the unexpected behavior, the graph structure comprising a set of nodes, one for each discrete programmatic function of the trace file and one for each error condition of the trace file, and a set of directional edges connecting the nodes, one connecting edge for each calling relationship and one connecting edge connecting an error condition node and a function node for the discrete programmatic function associated with the error condition; and
    computer usable program code configured to provide results from matching the converted graph structure against a plurality of stored graph structures, wherein each stored graph structure corresponding to unique record of a symptom database, each the unique record also being associated with a determined cause of the unexpected behavior, wherein the matched results comprise identifiers for the determined causes associated with the unique records for which stored graph structures match the converted graph structure.

5. The computer program product of claim 4, said computer usable program code that is executable by a computer comprising at least a processor and a memory comprising:
    computer usable program code configured to add a record to the symptom database that includes a determined cause of the unexpected behavior and the converted graph structure, whereby the added record is able to be queried and returned as a possible cause of unexpected behavior during future queries of the symptom database.

6. The computer program product of claim 4, wherein the records of the symptom database further comprise analysts input details related to a determined cause of the unexpected behavior, wherein the provided results comprise the analysts input details.

* * * * *